United States Patent [19]

Iwasaki et al.

[11] Patent Number: 4,757,178

[45] Date of Patent: Jul. 12, 1988

[54] BASE FOR SETTING MATERIALS TO BE PROCESSED BY NC WIRE ELECTRO-SPARK PROCESSING MACHINE

[75] Inventors: Satoshi Iwasaki; Hazime Sasaki; Yorimichi Hirako, all of Tokyo, Japan

[73] Assignee: Japan Automatic Machine Co., Ltd., Tokyo, Japan

[21] Appl. No.: 39,103

[22] Filed: Apr. 16, 1987

[30] Foreign Application Priority Data

Apr. 16, 1986 [JP] Japan .................. 61-56059[U]

[51] Int. Cl.$^4$ .................. B23H 7/02; B23Q 3/06
[52] U.S. Cl. .................. 219/69 R; 204/297 R; 269/303; 269/309
[58] Field of Search .................. 269/303, 309, 900; 219/69 R, 69 W, 69 M; 204/297 R

[56] References Cited

U.S. PATENT DOCUMENTS

| | | | |
|---|---|---|---|
| 2,415,259 | 2/1947 | Renton | 269/900 |
| 3,606,300 | 9/1971 | Davis | 269/309 |
| 4,184,669 | 1/1980 | Bald | 269/309 |
| 4,518,155 | 5/1985 | Lehmann | 269/309 |
| 4,603,391 | 7/1986 | Inoue et al. | 219/69 W |
| 4,656,326 | 4/1987 | Ramsbro | 219/69 R |

Primary Examiner—A. D. Pellinen
Assistant Examiner—Geoffrey S. Evans
Attorney, Agent, or Firm—Henry C. Nields

[57] ABSTRACT

A base on a movable table is used for determining the x and y coordinates of a workpiece. The base consists of a first reference base and a second reference base, with each reference base having a reference face with grooves adapted to receive a wire to determine the location of the side of the workpiece in one coordinate direction and two reference holes having wire guiding grooves for checking the thermal expansion of the side of the workpiece. Additionally each reference base has an indicator for showing both the distance between the two reference holes and the distance between the centers of the two reference holes and the reference face.

1 Claim, 1 Drawing Sheet

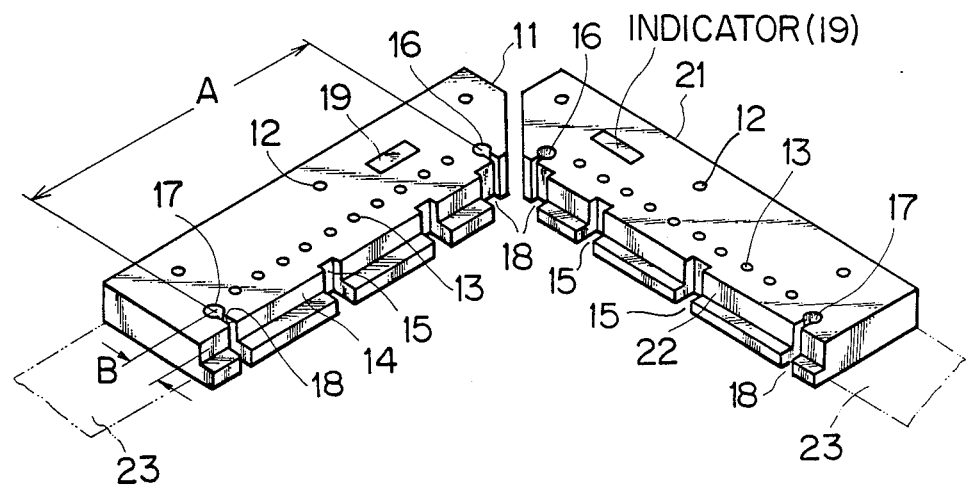
FIG_1
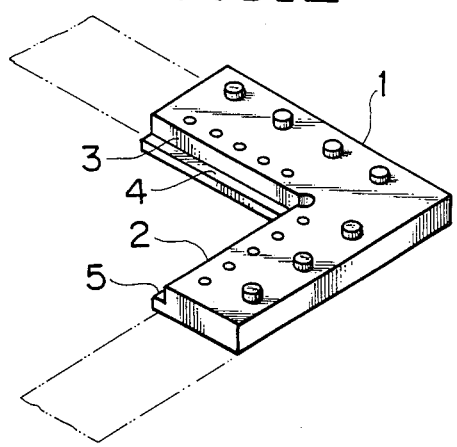
FIG_2

BASE FOR SETTING MATERIALS TO BE PROCESSED BY NC WIRE ELECTRO-SPARK PROCESSING MACHINE

BACKGROUND OF THE INVENTION

This invention relates to a base for setting materials to be processed by NC wire electro-spark processing machine.

In the electro-spark processing, when discharging is caused between two electrodes, the surfaces of the electrodes are molten and the molten part is blown due to pressure by the ambient liquid or gas. A process called as the electro-spark or discharging process applies such an action for carrying out boring, cutting or machining in metals and non-metals.

A process called as "wire electro-spark process" causes the discharging between one electrode (wire) of "+" and the other one (material to be procesed) of "−" so as to carry out the processing by touching the electrode, and a process called as "NC wire electro-spark process" carries out numerial control of the wire electro-spark process.

As the NC wire electro-spark process could be expected in precise processing, it has been broadly applied to processings of electronic parts, metal parts, lead frame of IC, cameras, spectacles, watches, or centerings of precision machines.

PRIOR ART

Conventinally, tools for setting the material to be processed are employed with L-shaped setting base 1 as shown in FIG. 2 on a table of the NC wire electro-spark processing machine which moves laterally or longitudinally. Said base is formed with a longitudinal reference face 2, lateral reference face 3 and horizontal reference faces 4 and 5.

Processings for the metal parts of IC lead frames have recently required severe conditions in centerings of the material to be processed.

SUMMARY OF THE INVENTION

The present invention is to provide a base for setting materials to be processed by NC wire electro-spark processing machine which is provided with grooves for checking reference faces and two holes for reference having specified spaces between said checking faces.

With respect to the above mentioned base,
(a) a base 1 which has been a one body in the prior art, is divided into the reference bases 11 and 21;
(b) the bases 11 and 21 are respectively defined with the grooves 15 for checking the reference faces;
(c) the bases 11 and 21 are further defined with two reference holes 16, 17;
(d) indicators 19 are provided for showing a central distance (A) between the reference holes 16 and 17, and showing a distance (B) between the centers of said holes 16, 17 and a reference face 14; and
(e) the reference holes 16, 17 are formed with wire guiding grooves 18.

By means of the above mentioned structure, it is possible to move the material in back-and-forth and right-and-left finely as microns, and accomplish centering or correction of thermal expansion of the material to be processed.

BRIEF DESCRIPTION OF THE DRAWINGS

FIG. 1 is a perspective view showing a setting base for materials to be procesed of NC wire electro-spark processing machine according to the invention; and FIG. 2 is a perspective view showing a setting base for materials to be processed of NC wire electro-spark processing machine according to the prior art.

DETAILED DESCRIPTION OF THE INVENTION

The invention will be explained with reference to an embodiment shown in FIG. 1. Reference bases 11, 21 are formed with bolt holes 12 for setting the material to be processed on the moving table 23 of the NC wire electro-spark processing machine, and screw holes 13 for the same.

In the reference base 11, the face 14 is defined with a groove 15 for measuring a position of the material to be processed by means of a wire, and two circular holes 16, 17 having wire guiding grooves 18 for checking the position of a side of the material and the length of the reference. On the other hand, another reference base 21 is positioned on the table 23 of the NC wire electro-spark processing machine so as to define L shape with said reference base 11, and the reference faces of the bases 11 and 21 are secured with bolts at required precision of lateral degree with respect to the moving directions of the material to be processed.

Therefore, since the fixture of the setting base is independently effected in back-and-forth and right-and-left, it is contributed to the precision of the NC wire electro-spark processing machine. With respect to the right angle of the L shaped reference faces, it is possible to maintain 1 micron. Further also for changings by time-passing, since it is no longer necessary to dismantle the bases as conventionally, the correction of positioning may be performed at low cost.

Measuring via the groove 15 is for checking the reference face 14 and the side face of the material to be processed, while measuring via the circular holes 16, 17 is for checking the amount of the thermal expansion due to difference in temperature and numerical values to be corrected are indicated in the indicators 19.

When a material to be processed is big, an electrode wire is passed through the grooves 15, and is directly contacted to the side of the material so as to measure and confirm the present position of the table 23.

When the material is small, since said side of the material could not be checked via the groove 15, the electrode wire is guided therefore into the circular holes 16 or 17 and the position is measured indirectly by calculation.

With respect to the case that the material is small, assume that the diameter of the hole 16 or 17 is $W-X$ and the radius is R. The center of the hole can be obtained by $(W+X)/2$. Assume that the diameters of the electrode wires at the inner wall of the hole are Y and Z, the center of the hole can be also obtained by $(Y-R)/2+(Z+R)/2=(Y+Z)/2$. That is, $\frac{1}{2}$ of the moving amount of the electrode wire guided in the hole is the center position of the hole, irrespectively of thickness of the wire. By utilizing this relation, it is possible to check the distance between the center position of the circular reference hole and the reference face, and determine and confirm original points for processing.

In the reference base 11, the diamter of the circular hole 16 and the center distances A and B are shown in the indicators 19. The distance A between the center of the hole 16 and the center of the holes 17, or the distance B between the reference face 14 and the hole 17 are measured, so that errors by the difference in temperature can be measured, and correction in positioning may be effected. Thus, products of high precision may be made by the NC wire electro-spark processing.

What is claimed is:

1. A base for determining the X and Y coordinates of a workpiece aligned against said base, which workpiece is to be processed in an X-Y plane by an NC wire electro-spark processing machine having a movable table upon which said base is supported, comprising:

a first reference base mounted on said movable table, said first reference base having a first reference face adapted to contact one side face of said workpiece, said first reference face having grooves adapted to receive the wire of said machine for directly determining the location of the side of said material in one coordinate direction, and said first reference base having first means for indirectly determining the location of the side of said material in said one coordinate direction, said first means comprising two circular reference holes with grooves adapted to receive the wire of said machine, the centers of said holes being a first fixed distance apart from each other and a second fixed distance from the first reference face; and a second reference base independently mounted on said movable table, said second reference base having a second reference face adapted to contact another side face of said workpiece, said second reference face having grooves adapted to receive the wire of said machine for directly determining the location of the side of said material in another coordinate direction, and said second reference base having second means for indirectly determining the location of the side of said material in said another coordinate direction, said second means comprising two circular reference holes with grooves adpated to receive the wire of said machine, the centers of said holes being a first fixed distance apart from each other and a second fixed distance from the second reference face.

* * * * *